US010158533B2

(12) United States Patent
Kashyap et al.

(10) Patent No.: US 10,158,533 B2
(45) Date of Patent: *Dec. 18, 2018

(54) SYSTEM AND METHOD FOR BASE TOPOLOGY SELECTION

(71) Applicant: DELL PRODUCTS L.P., Round Rock, TX (US)

(72) Inventors: Prakash Kashyap, Cupertino, CA (US); Arun Sarat Yerra, Santa Clara, CA (US)

(73) Assignee: Dell Products L.P., Round Rock, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/351,284

(22) Filed: Nov. 14, 2016

(65) Prior Publication Data
US 2017/0063637 A1    Mar. 2, 2017

Related U.S. Application Data

(63) Continuation of application No. 13/911,548, filed on Jun. 6, 2013, now Pat. No. 9,525,597.

(51) Int. Cl.
*H04L 12/751* (2013.01)
*H04L 12/24* (2006.01)
*H04L 12/26* (2006.01)

(52) U.S. Cl.
CPC .............. *H04L 41/12* (2013.01); *H04L 43/04* (2013.01); *Y02D 30/30* (2018.01)

(58) Field of Classification Search
None
See application file for complete search history.

(56) References Cited

U.S. PATENT DOCUMENTS

| | | | |
|---|---|---|---|
| 2010/0097926 A1* | 4/2010 | Huang | G06F 11/2005 370/219 |
| 2011/0228696 A1 | 9/2011 | Agarwal | 370/253 |
| 2012/0155511 A1* | 6/2012 | Shaffer | H04B 1/7143 375/133 |
| 2013/0194914 A1* | 8/2013 | Agarwal | H04L 45/245 370/225 |

* cited by examiner

*Primary Examiner* — Yemane Miesfin
*Assistant Examiner* — Jeff Banthrongsack
(74) *Attorney, Agent, or Firm* — Haynes and Boone, LLP (57) ABSTRACT

A system and method for base topology selection includes a network controller including a control unit and one or more ports coupled to the control unit and configured to couple the network controller to one or more network switching devices of a network. The network controller is configured to receive initiation messages from the network switching devices, receive configuration and status messages from the network switching devices, transmit discovery requests to the network switching devices, receive discovery responses from the network switching devices, determine a network topology of the network based on information associated with the initiation messages, the configuration and status messages, and the discovery responses, apply heuristic rules to the network topology, and select a base topology based on results of the applied heuristic rules. The network controller may further be configured to transmit flow control messages to the network switching devices to provision the network consistent with the selected base topology.

18 Claims, 6 Drawing Sheets

SYSTEM AND METHOD FOR BASE TOPOLOGY SELECTION

RELATED APPLICATIONS

This application is a continuation of U.S. patent application Ser. No. 13/911,548, filed Jun. 6, 2013, the disclosure of which is hereby incorporated by reference in its entirety.

BACKGROUND

The present disclosure relates generally to information handling systems, and more particularly to base topology selection in networks.

As the value and use of information continues to increase, individuals and businesses seek additional ways to process and store information. One option is an information handling system (IHS). An IHS generally processes, compiles, stores, and/or communicates information or data for business, personal, or other purposes. Because technology and information handling needs and requirements may vary between different applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

Additionally, some embodiments of information handling systems include non-transient, tangible machine-readable media that include executable code that when run by one or more processors, may cause the one or more processors to perform the steps of methods described herein. Some common forms of machine readable media include, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Computer networks form the interconnection fabric that enables reliable and rapid communications between computer systems and data processors that are in both close proximity to each other and at distant locations. These networks create a vast spider web of intranets and internets for handling all types of communication and information. Making all of this possible is a vast array of network switching products that make forwarding decisions in order to deliver packets of information from a source system or first network node to a destination system or second network node. Due to the size, complexity, and dynamic nature of these networks, sophisticated network switching products are often required to continuously make forwarding decisions and to update forwarding information as network configurations change. Further, as these networks are developed and reconfigured over time, a topology among each of the network switching products in the network may often become quite complex. Often a base topology may be imposed on the network that may be used to establish desired and/or preferred network traffic patterns through the network. However, due to the complexity of the network, it may become difficult to recognize patterns associated with many base topologies and/or to identify more advantageous ways of configuring the network switching products to best establish and utilize possible network traffic patterns in the network.

Accordingly, it would be desirable to provide improved methods and systems for determining one or more possible base topologies for a network. It would further be desirable to support the selection of a base topology selected from the possible base topologies and to provision the network switching devices of the network consistent with the selection.

SUMMARY

According to one embodiment, a network controller includes a control unit and one or more ports coupled to the control unit and configured to couple the network controller to one or more network switching devices of a network. The network controller is configured to receive initiation messages from the network switching devices, receive configuration and status messages from the network switching devices, transmit discovery requests to the network switching devices, receive discovery responses from the network switching devices, determine a network topology of the network based on information associated with the initiation messages, the configuration and status messages, and the discovery responses, apply heuristic rules to the network topology, and select a base topology based on results of the applied heuristic rules.

According to another embodiment, a method of network management includes receiving initiation messages from network switching devices in a network, receiving configuration and status messages from the network switching devices, transmitting discovery requests to the network switching devices, receiving discovery responses from the network switching devices, determining a network topology of the network based on information associated with the initiation messages, the configuration and status messages, and the discovery responses, applying heuristic rules to the network topology, and selecting a base topology based on results of the applied heuristic rules.

According to yet another embodiment, an information handling system includes a network controller. The network controller includes a control unit, one or more ports coupled to the control unit and configured to couple the network controller to one or more network switching devices of a network, and a plurality of heuristic rules. The network controller is configured to receive initiation messages from the network switching devices, receive configuration and status messages from the network switching devices, transmit discovery requests to the network switching devices, receive discovery responses from the network switching devices, determine a network topology of the network based on information associated with the initiation messages, the configuration and status messages, and the discovery responses, apply the heuristic rules to the network topology, select a base topology based on results of the applied heuristic rules, and transmit flow control messages to the network switching devices to provision the network consistent with the selected base topology.

BRIEF DESCRIPTION OF THE DRAWINGS

In the figures, elements having the same designations have the same or similar functions.

DETAILED DESCRIPTION

In the following description, specific details are set forth describing some embodiments consistent with the present disclosure. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

For purposes of this disclosure, an IHS may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an IHS may be a personal computer, a PDA, a consumer electronic device, a display device or monitor, a network server or storage device, a switch router or other network communication device, or any other suitable device and may vary in size, shape, performance, functionality, and price. The IHS may include memory, one or more processing resources such as a central processing unit (CPU) or hardware or software control logic. Additional components of the IHS may include one or more storage devices, one or more communications ports for communicating with external devices as well as various input and output (I/O) devices, such as a keyboard, a mouse, and a video display. The IHS may also include one or more buses operable to transmit communications between the various hardware components.

Figure 1:
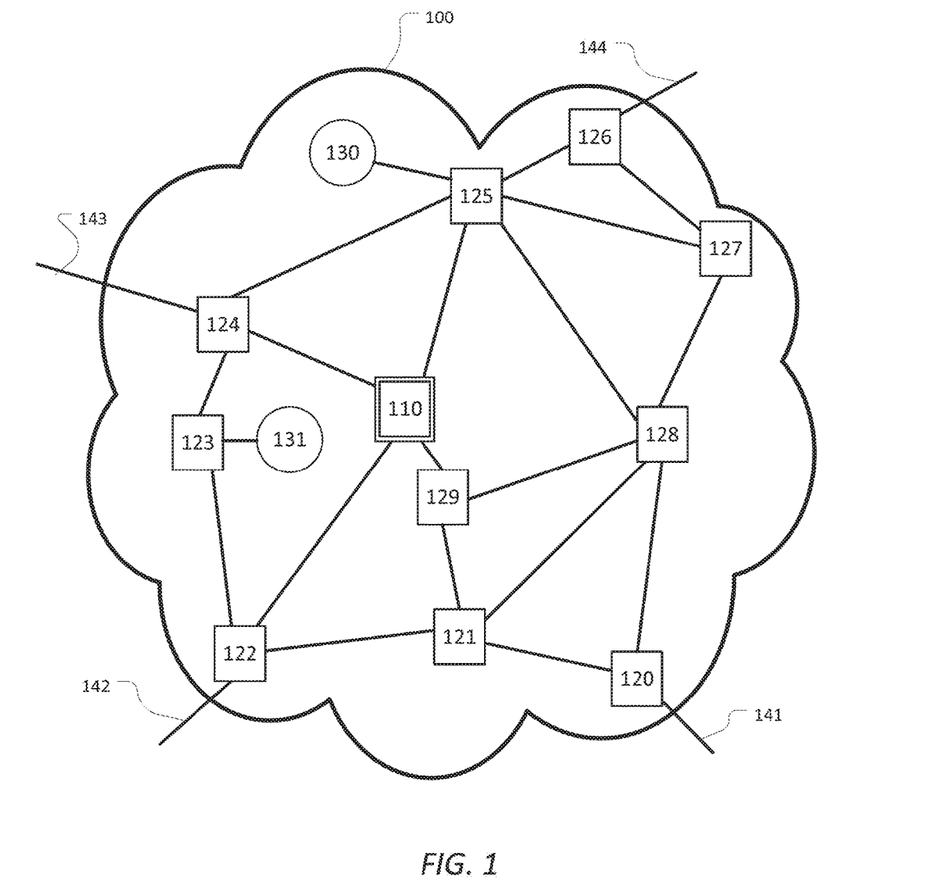
FIG. 1 is a simplified diagram of a network 100 according to some embodiments.

FIG. 1 is a simplified diagram of a network 100 according to some embodiments. As shown in FIG. 1, network 100 includes a network controller 110. In some examples, network controller 110 may provide centralized management of network 100 and the network traffic throughout network 100. In some examples, network controller 110 may be using software defined networking (SDN). In SDN, management and control of forwarding within network 100 may be at least partially separated from network switching devices that do the actual forwarding. In some examples, this may be used to provide more centralized management and control of the forwarding.

Network 100 further includes one or more network switching devices or switches, including switches 120-129. Although only ten switches 120-129 are shown in FIG. 1, one of ordinary skill in the art would recognize that network 100 may include any number of switches. Network 100 further includes representative network devices 130 and 131. As with the switches 120-129, network 100 may include any number of network devices. In some examples, network devices 130 and 131 may be devices that can be coupled into network 100, but may not provide the same switching and forwarding functions as switches 120-129. In some examples, network devices 130 and 131 may be leaf nodes of network 100. In some examples, network devices 130 and/or 131 may be servers. In some examples, network devices 130 and/or 131 may be user devices such as computers, mobile devices, and the like.

Network links may be used to couple together network controller 110, the switches 120-129, and the network devices 130 and 131 in various arrangements. As shown in FIG. 1, network links are depicted using lines between the switches 120-129 and/or the network devices 130 and 131. For example, switch 128 is coupled to switches 120, 121, 129, 125, and 127 using corresponding network links. In contrast, switch 122 is coupled only to switches 121 and 123 as well as to network controller 110 using corresponding network links. Network device 130 is coupled only to switch 125 using a corresponding network link. Although only one network link is shown between any two switches 120-129, network controller 110, and network devices 130, 131, one of ordinary skill in the art would recognize that multiple parallel network links and/or link aggregation groups (LAGs) may be used as well. In some examples, network links between two switches may be inter-switch links.

Network 100 further supports forwarding of network traffic between network controller 110, the switches 120-129, and the network devices 130 and 131. For example, network traffic may be forwarded from switch 127 to switch 124 using one or more of many potential routes. In some examples, network traffic may be forwarded from switch 127 through switch 125 to switch 124. In some examples, network traffic may be forwarded through switches 128, 121, 122, and 123 to switch 124. In some examples, other routes may be used.

Network 100 further supports forwarding and/or routing of network traffic to networks other than network 100. As shown in FIG. 1, network 100 is coupled to other networks using network links 141-144.

Characterizing and/or recognizing patterns in the topology of network 100 may not be trivial. In some examples, it may not be readily apparent whether the topology of network 100 may be able to support one or more base topologies. In some examples, the base topologies may include topologies that support one or more forwarding protocols. In some examples, the one or more protocols may include virtual link trunking (VLT), stacking protocols, spanning tree protocol (STP), multiple spanning tree protocol (MSTP), shortest path bridging MAC (SPBM), transparent interconnection of lots of links (TRILL), and the like.

Figure 2:
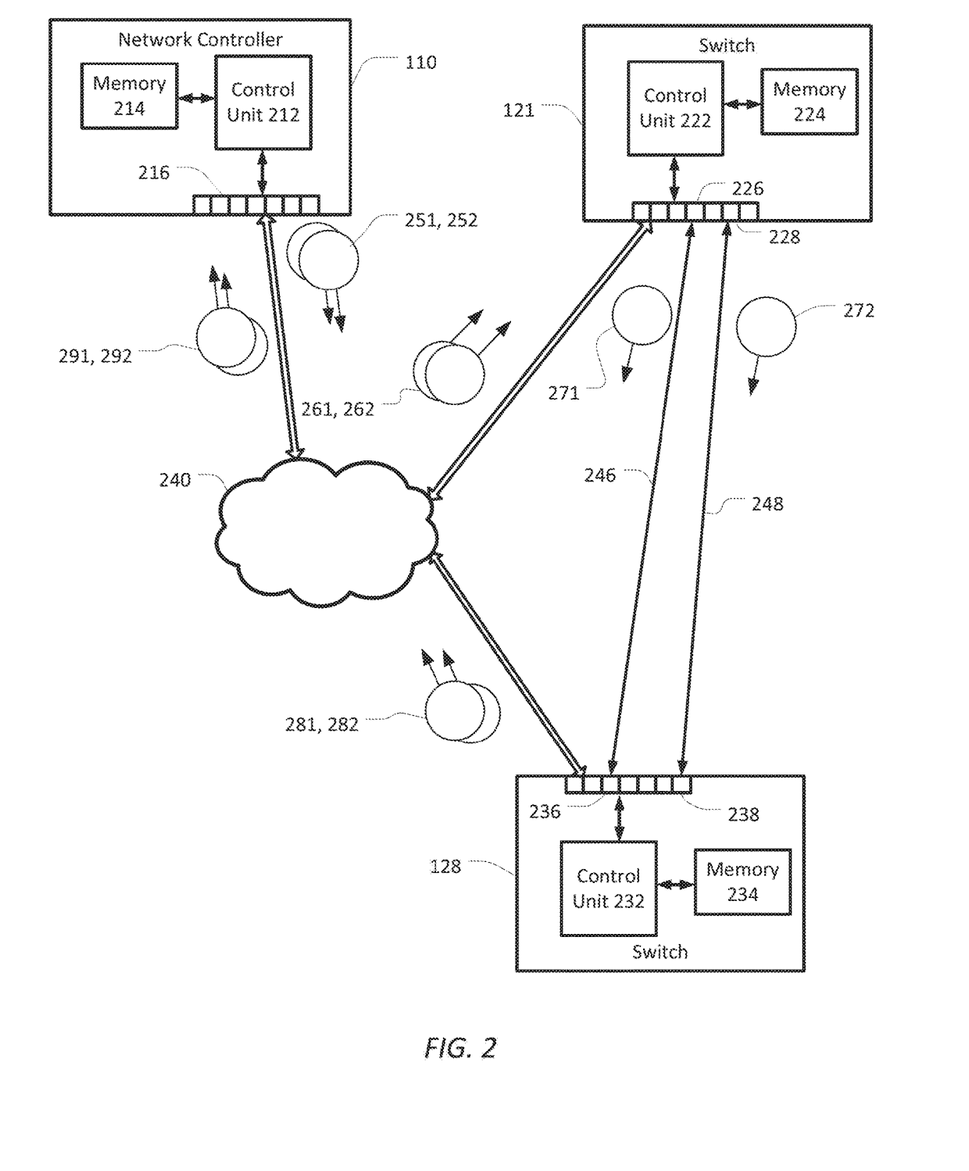
FIG. 2 is a simplified diagram of a portion of the network of FIG. 1 according to some embodiments.

FIG. 2 is a simplified diagram of a portion of the network 100 of FIG. 1 according to some embodiments. As shown in FIG. 2, a representative portion of network 100 is depicted, which includes network controller 110 and switches 121 and 128. FIG. 2 also depicts further details of network controller 110 and switches 121 and 128, as well as several network links in network 100.

Network controller 110 includes a control unit 212 and memory 214. Control unit 212 is coupled to memory 214 and may control the operation of network controller 110. In some examples, control unit 212 may include one or more processors. Network controller 110 further includes one or more ports 216 for coupling network controller 110 to other switches and/or network devices using network links.

Switch 121 includes a control unit 222 and memory 224. Control unit 222 is coupled to memory 224 and may control the operation of switch 121. In some examples, control unit 222 may be used to make forwarding decisions for network traffic being handled by switch 121. In some examples, the control unit 222 may include one or more processors. Switch 121 further includes one or more ports, including ports 226 and 228, for coupling switch 121 to other switches, network devices, and/or network controllers.

Similarly, switch 128 includes a control unit 232 and memory 234. Control unit 232 is coupled to memory 234 and may control the operation of switch 128. In some examples, control unit 232 may be used to make forwarding decisions for network traffic being handled by switch 128. In some examples, the control unit 232 may include one or more processors. Switch 128 further includes one or more ports, including ports 236 and 238, for coupling switch 128 to other switches, network devices, and/or network controllers.

The memories 214, 224, and/or 234 may include one or more types of machine readable media. Some common forms of machine readable media may include floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

The portion of network 100 further depicts some interconnections between network controller 110 and switches 121 and 128. A significant portion of the interconnections are abstracted as a sub-network 240. Sub-network 240 may include many of the switches, network devices, and network links of network 100. Sub-network 240 is coupled to the one or more ports 216 of network controller 110, some of the one or more ports of switch 121, and some of the one or more ports of switch 128. In some examples, sub-network 240 may include at least switch 129 as well as the network link between network controller 110 and switch 129, between switch 129 and switch 121, and between switch 129 and switch 128. In some examples, sub-network 240 may further include others of switches 120 and 122-127, network devices 130 and 131, and/or corresponding network links between them.

FIG. 2 further depicts several network links 246 and 248 coupling switches 121 and 128. Network link 246 couples port 226 of switch 121 to port 236 of switch 128. Network link 248 couples port 228 of switch 121 to port 238 of switch 128.

In some embodiments, before network controller 110 may support identification and/or selection of a base topology and/or forwarding protocols, network controller may use one or more discovery mechanisms to discover and/or infer the presence of and/or location of switches 120-129 and network devices 130 and 131, as well as the network links between them. In some examples, because network controller 110 is a SDN controller, network controller may exchange status, management, and/or flow control messages with the network switches of network 100, including network switches 121 and 128.

Figure 3:
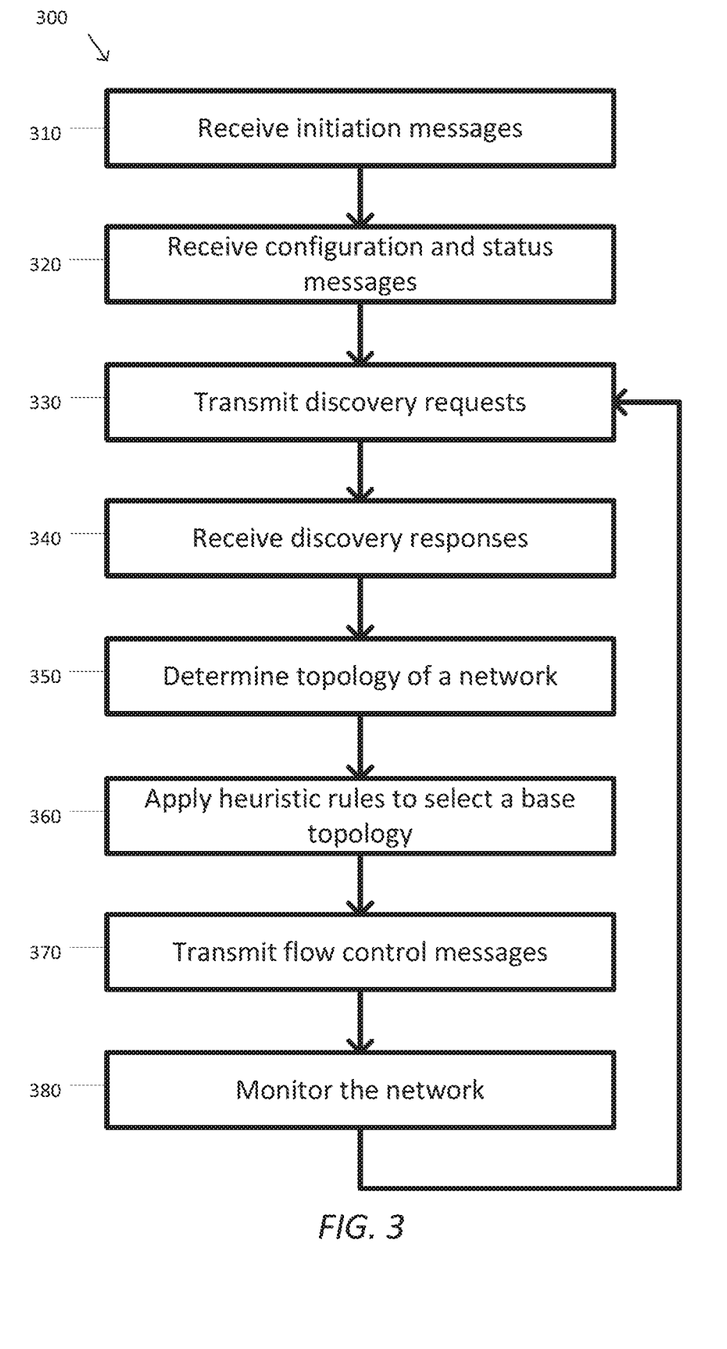
FIG. 3 is a simplified diagram showing a method of managing a network according to some embodiments.

FIG. 3 is a simplified diagram showing a method 300 of managing a network according to some embodiments. As shown in FIG. 3, the method 300 includes a process 310 for receiving initiation messages, a process 320 for receiving configuration and status messages, a process 330 for transmitting discovery requests, a process 340 for receiving discovery requests, a process 350 for determining a topology of a network, a process 360 for applying heuristic rules to select a base topology, a process 370 for transmitting flow control messages, and a process 380 for monitoring the network. According to certain embodiments, the method 300 of managing a network can be performed using variations among the processes 310-380 as would be recognized by one of ordinary skill in the art. In some embodiments, the process 380 may be omitted. In some embodiments, one or more of the processes 310-380 of method 300 may be implemented, at least in part, in the form of executable code stored on non-transient, tangible, machine readable media that when run by one or more processors (e.g., one or more processors in control unit 212 of network controller 110 and/or control units 222 and 232 of switches 121 and 128, respectively) may cause the one or more processors to perform one or more of the processes 310-380.

At the process 310, initiation messages are received. In many networks (e.g., network 100) discovery of a topology for the network begins with a network controller (e.g., network controller 110) determining which switches are present in the network. In some examples, this may be accomplished by having each switch in the network (e.g., switches 120-129) announce their presence to the network controller using initiation messages. Each switch may transmit one or more initiation messages on one or more ports of the switch. When the switch is directly coupled to the network controller (e.g., switch 122 with network controller 110 in FIG. 1), the initiation message is received by the network controller. When the switch is not directly coupled to the network controller, other switches in the network may forward and/or flood the initiation message to the network controller. In some examples, the initiation message may include a login request from the switch asking the network controller whether the switch may enter the network. In some examples, the initiation messages may be OpenFlow messages using the OpenFlow protocol. In some examples, the network controller may respond to the initiation messages by transmitting a welcome message back to the corresponding switches admitting them to the network. In some examples, each initiation message and welcome message pair may create a management session between the network controller and the switch that may be used to exchange further messages.

At the process 320, configuration and status messages may be received. In some examples, once the network controller receives initiation messages from the switches, the network controller may exchange one or more management messages with each of those switches. In some examples, the network controller may transmit one or more request messages to the switches requesting additional configuration and status information from the switches. In some examples, the switches may respond with the configuration and status messages in which the switches describe themselves. In some examples, the configuration and status messages may include a type of each of the switches. From the type of each of the switches, the network controller may determine how many ports each switch includes and a bandwidth of each of the ports. In some examples, the configuration and status messages may include a count of a number of the ports of each of the switches that are active and/or a list of the active ports. In some examples, the management messages and/or the configuration and status messages may be OpenFlow messages.

At the process 330, discovery requests are transmitted. Based on the configuration and status messages received during process 320, the network controller is able to identify the switches and active ports in the network. In some examples, the list of active ports received during process 320 indicates which ports on the respective switches are coupled to a network link. In order to determine the topology for the network, the network controller must know not only which ports are coupled to network links, but whether the network links are inter-switch links and how the network links interconnect the switches. During process 330, the network controller forms a discovery request message corresponding to each switch and active port discovered during process 320. Each discovery request message includes a request that the respective switch transmit a discovery packet on a specific egress port. The discovery packet includes an originating switch identifier corresponding to the respective switch and an egress port identifier corresponding to the egress port. The discovery packet is then transmitted by the respective switch on the egress port. When the egress port is coupled to an ingress port on another switch, the another switch forms a discovery response message and transmits it to the network controller. The discovery response message includes the originating switch identifier of the respective switch, the egress port identifier of the egress port, a receiving switch identifier of the another switch, and the ingress port identifier of the ingress port. Thus, the discovery response message includes information to determine which switches and ports are on each end of the network link. When the network link couples the egress port to a network device that is not a switch (e.g., network devices 130 and/or 131), no discovery response message is formed or transmitted. In some examples, the discovery request and/or discovery response messages may be OpenFlow messages. In some examples, the discovery packets may be Link Layer Discovery Protocol (LLDP) data units.

When the network link couples the egress port to another network (e.g., network links 141-144), no discovery response message is formed or transmitted because the network controller only exchanges discovery request and response messages with the switches of its own network. When the network link couples the egress port directly to the network controller, the network controller, no discovery response message is needed. In some examples, the network controller may already know where and how it is coupled to the originating switch based on the initiation and/or configuration and status messages the network controller has already exchanged with the originating switch. In some examples, when the network controller already knows of the coupling to the originating switch, the network controller may omit sending a discovery request message corresponding to the directly coupled originating switch and port.

The network link discovery mechanisms of process 330 are illustrated in greater detail with reference back to FIG. 2. As a result of performing processes 310 and 320, network controller 110 knows about switch 121 and that ports 226 and 228 of switch 121 are active ports. As further shown in FIG. 2, network controller 110 is transmitting discovery request messages 251 and 252. Discovery request message 251 is directed to switch 121 and requests that switch 121 transmit a discovery packet on port 226. Discovery request message 251 is forwarded through sub-network 240 where it is received by switch 121 as discovery request message 261. Following the instructions of discovery request message 261, switch 121 forms a discovery packet 271 including an originating switch identifier of 121 and an egress port identifier of 226 and transmits it using port 226 as the egress port. Discovery packet 271 is transmitted along network link 246 where it is received by switch 128 on port 236 making port 236 the ingress port. When switch 128 receives discovery packet 271, switch 128 forms a discovery response message 281 including the originating switch identifier 121 and egress port identifier 226 from discovery packet 271 as well as its own switch identifier of 128 as the receiving switch identifier and the ingress port identifier 236. Discovery response 281 is then transmitted by switch 128 where it is forwarded through sub-network 240 and received by network controller 110 as discovery response message 291.

Similarly, discovery request message 252 requests that switch 121 transmit a discovery packet on port 228. Discovery request message 252 is received by switch 121 as discovery request message 262. In response, switch 121 forms and transmits a discovery packet 272 on port 228 including an originating switch identifier of 121 and an egress port identifier of 228. When discovery packet 272 is received by switch 128 on port 238, switch 128 forms and transmits a discovery response message 282 including the originating switch identifier 121 and egress port identifier 228 as well as its own switch identifier of 128 as the receiving switch identifier and the ingress port identifier 238. Discovery response 282 is then transmitted by switch 128 where it is forwarded through sub-network 240 and received by network controller 110 as discovery response message 292.

At the process 340, discovery responses are received. As a result of the discovery requests transmitted by the network controller during process 330, the network controller receives corresponding discovery responses. By examining each discovery response received, the network controller may learn about each inter-switch link in the network. The originating switch identifier, egress port identifier, receiving switch identifier, ingress port identifier indicate to the network controller the existence of a functioning inter-switch link between the egress port of the originating switch and the ingress port of the receiving switch. In some examples, the network controller may have also transmitted a corresponding reciprocal discovery request to the receiving switch for the ingress port during process 330 that may result in its own discovery response for the same network link. In some examples, when the network controller does not receive a discovery response corresponding to one of the discovery requests, the network controller may conclude that the respective port is not coupled to an inter-switch link. In some examples, this may occur when the port is coupled via a network link to a network device that is not a switch or to a switch in another network. In some examples, when the network controller does not receive a discovery response corresponding to one of the discovery requests, the network controller may repeat the process 330 one or more times for the corresponding originating switch and egress port to account for the possibility of dropped and/or damaged messages.

Referring back to FIG. 2. When network controller 110 receives discovery response message 291, which includes the originating switch identifier of 121, the egress port identifier of 226, the receiving switch identifier of 128, and the ingress port identifier of 228, network controller 110 may learn of network link 246. Similarly, when network controller 110 receives discovery response message 292, network controller 110 may learn of network link 248. Although not shown in FIG. 2, network controller 110 may also learn of network links 246 and 248 based on discovery request messages transmitted to switch 128 for ports 236 and 238, respectively, which are returned as received discovery response messages from switch 121.

At the process 350, a topology for the network is determined. Based on the initiation messages received during process 310, the configuration and status messages received during process 320, and/or the discovery responses received during process 340, the topology of the network may be determined. In some examples, the initiation messages may indicate all of the switches in the network. In some examples, the configuration and status messages may indicate the type and active ports on each of the switches. In some examples, the discovery responses may indicate how the switches are coupled by inter-switch links. In some examples, the discovery responses may further indicate where there are network links to network devices and/or other networks. Thus, the network controller is able to learn about all of the switches in the network and how they coupled using the inter-switch links.

At the process 360, heuristic rules are applied to select a base topology. Once the topology of the network is determined during the process 350, heuristic rules may be applied to determine how well various base topologies may correspond to the topology of the network. In some examples, there is no single ideal base topology for the topology of the network. However, heuristic rules may be used to recognize specific patterns in the topology of the network and to evaluate how well one or more base topologies may map to those patterns. Further, when some of the patterns suggest multiple possible mappings, the heuristic rules may provide a suitable framework for determining whether one of the mappings is a better choice than another. In some examples, the heuristic rules may evaluate how well each of the mappings applies and assign one or more weights to each mapping in order to select among them. In some examples, the network may be divided into sub-networks, and the heuristic rules may be applied separately to each of the sub-networks. Based on results of the heuristic rules, the base topology for the network is selected.

Figure 4:
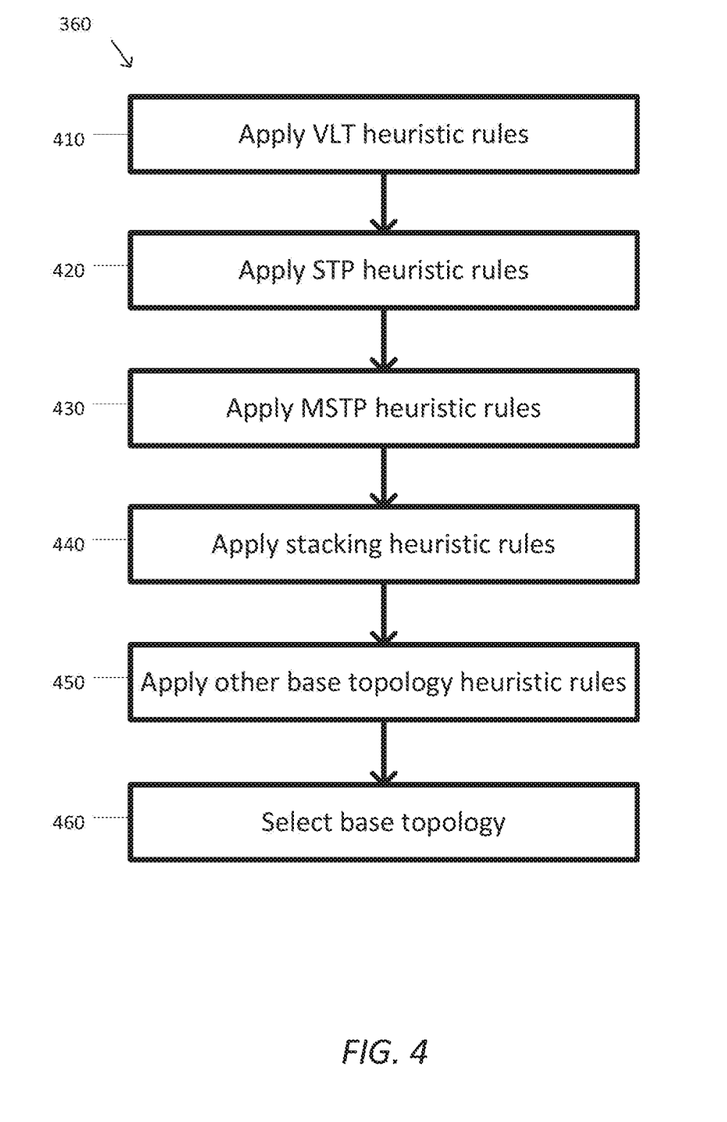
FIG. 4 is a simplified diagram of a process for applying heuristic rules to select a base topology according to some embodiments.

FIG. 4 is a simplified diagram of the process 360 for applying heuristic rules to select the base topology according to some embodiments. As shown in FIG. 4, the process 360 includes a process 410 for applying VLT heuristic rules, a process 420 for applying STP heuristic rules, a process 430 for applying MSTP heuristic rules, a process 440 for applying stacking heuristic rules, a process 450 for applying other base topology heuristic rules, and a process 460 for selecting a base topology. According to certain embodiments, the process 360 for applying heuristic rules to select the base topology can be performed using variations among the processes 410-460 as would be recognized by one of ordinary skill in the art. In some embodiments, one or more of the processes 410-460 of process 360 may be implemented, at least in part, in the form of executable code stored on non-transient, tangible, machine readable media that when run by one or more processors (e.g., one or more processors in control unit 212 of network controller 110) may cause the one or more processors to perform one or more of the processes 410-460.

At the process 410, VLT heuristic rules are applied. The topology of the network determined during process 350 may be analyzed to determine its suitability for a base topology that includes one or more VLTs. In general, one or more heuristic rules are applied to the topology of the network to detect patterns among the switches and the inter-switch links that are suitable for the formation of peer groups among switches and/or VLTs.

Figure 5:
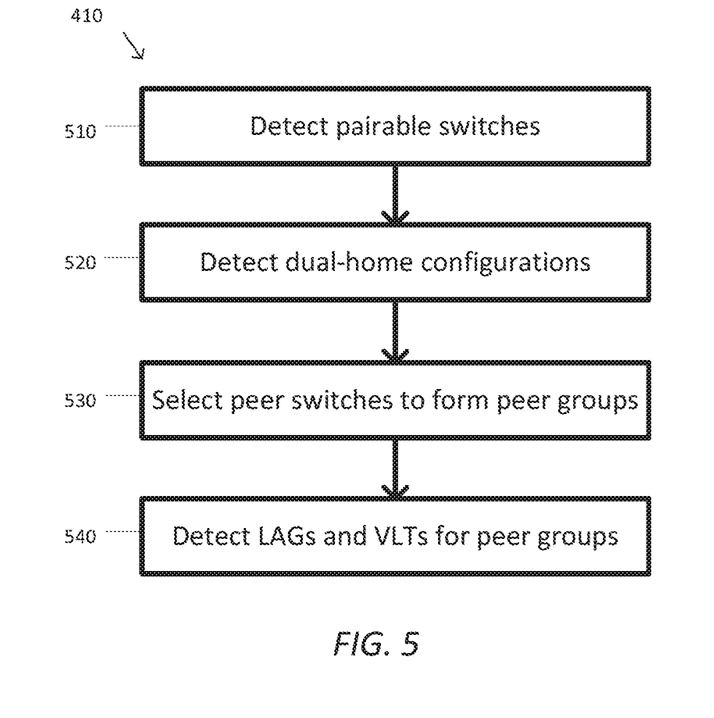
FIG. 5 is a simplified diagram of a process for applying VLT heuristic rules to a network topology according to some embodiments.

FIG. 5 is a simplified diagram of the process 410 for applying VLT heuristic rules to a network topology according to some embodiments. As shown in FIG. 5, the process 410 includes a process 510 for detecting pairable switches, a process 520 for detecting dual-home configurations, a process 530 for selecting peer switches to form peer groups, and a process 540 for detecting LAGs and VLTs for the peer groups. According to certain embodiments, the process 410 for applying VLT heuristic rules to a network topology can be performed using variations among the processes 510-540 as would be recognized by one of ordinary skill in the art. In some embodiments, one or more of the processes 510-540 of process 410 may be implemented, at least in part, in the form of executable code stored on non-transient, tangible, machine readable media that when run by one or more processors (e.g., one or more processors in control unit 212 of network controller 110) may cause the one or more processors to perform one or more of the processes 510-540.

At the process 510, pairable switches are detected. The topology of the network determined during process 350 may be analyzed to detect the pairable switches in the network. In some examples, any two switches in the network are pairable when they share at least one inter-switch link. As some examples from network 100 of FIG. 1, the following groups of switches are pairable 120 and 121, 120 and 128, 121 and 122, 121 and 128, 121 and 129, 122 and 123, 123 and 124, 124 and 125, 125 and 126, 125 and 127, 125 and 128, 126 and 127, 127 and 128, as well as 128 and 129. In contrast switches 120 and 123 are examples of two switches that are not pairable switches.

At the process 520, dual-home configurations are detected. Using the pairable switches detected during process 510, the topology of the network determined during process 350 may be analyzed to detect dual-home configurations. A dual-home configuration exists anywhere a third switch is coupled via inter-switch links to both switches in a group of pairable switches. In other words, a dual-home configuration may exist whenever three switches are coupled using inter-switch links in a triangular pattern. As an example from network 100 of FIG. 1, switch 120 has a dual-home configuration with the pairable switches 121 and 128 because switch 120 is coupled to both switches 121 and 128 by inter-switch links and switches 121 and 128 are coupled by an inter-switch link. Similarly, switch 129 also has a dual-home configuration with the pairable switches 121 and 128. In other examples, switch 128 is in a dual-home configuration with switches 120 and 121, switches 121 and 129, as well as switches 125 and 127. In contrast, there is no dual home configuration between switch 122 and switches 121 and 129 even though switches 121 and 129 are pairable because switch 122 is not coupled to switch 129 by an inter-switch link.

At the process 530, peer switches are selected and peer groups are formed. Using the pairable switches detected during process 510 and the dual home configurations detected during process 520, further heuristic rules are applied to determine which groups of pairable switches are better candidates to become peer groups. In some examples, pairable switches that are part of more dual-home configurations make better candidates for peer groups. In some examples, diamond-shaped patterns among the switches with at least one diagonal across the diamond are preferred over the triangles of dual-home configurations. As examples from network 100 of FIG. 1, the pairable switches 121 and 128 may be better candidates for a peer group than the pairable switches 120 and 121 because pairable switches 121 and 128 are part of dual-home configurations with switches 120 and 129, but pairable switches 120 and 121 are part of a dual home configuration only with switch 128.

In some examples, pairable switches that are coupled to fewer (or no) network links that are not inter-switch links make better candidates for peer groups because those pairable switches may more easily be able to be configured using only dual-home configurations. In other words, it may be easier to provision a base topology so that peer groups are only configured in dual-home configurations (e.g., by disabling some of the inter-switch links) than when a network device that is not a switch is coupled to only one of the switches in the pairable switches. As examples from network 100 of FIG. 1, the pairable switches 121 and 128 may be better candidates for a peer group than the pairable switches 125 and 127 because switch 125 is coupled to network device 130 and network controller 110 by non-inter-switch links whereas neither switch 121 nor 128 are coupled via non-inter-switch links.

In some examples, each of the heuristic rules that are applied to the pairable switches may assign different scores as to whether the pairable switches would make good candidates for a peer group. In some examples, composite scores may be formed when multiple heuristic rules are applied to the same pairable switches. In some examples from network 100 of FIG. 1, the pairable switches 121 and 128 would be assigned higher scores as a peer group than either pairable switches 125 and 127 or pairable switches 120 and 121.

In some examples, once the scores are available for the pairable switches, the peer groups are selected from among the pairable switches with the higher scores. In some examples, the peer groups are selected so that they do not have intersecting switches. In some examples from network 100 of FIG. 1, both pairable switches 121 and 128 and pairable switches 127 and 128 might not be selected because of the overlap of switch 128. In some examples, additional heuristic rules may be used to select a larger number of peer groups from the network, select peer groups so that a larger number of dual-home configurations are used, etc. In some examples, further heuristic rules may provide overall ratings as to the suitability of using peer groups in the network and/or in one or more sub-networks of the network.

At the process 540, LAGs and VLTs for the peer groups are detected. Based on the peer groups selected during process 530, the LAGs and VLTs are detected in the topology of the network. In some examples, the inter-switch links between the pairable switches in a peer group may create a LAG. In some examples, the LAG between the pairable switches in the peer group may also be an inter-chassis link (ICL). In the example of FIG. 2, when pairable switches 121 and 128 are selected as a peer group, the inter-switch links 146 and 148 may be used to form a LAG and/or an ICL. In some examples, the switches in a dual-home configuration with the pairable switches in a peer group may also have a LAG to the pairable switches in the peer group. In some examples, the LAG from the dual-home configuration may also be a VLT. In some examples from network 100 of FIG. 1, when pairable switches 121 and 128 are selected as a peer group, the inter-switch links between switch 120 and switches 121 and 128 may be a LAG and/or a VLT that switch 120 may use between itself and the pairable switches 121 and 128. Similarly, switch 129 may also have a LAG and/or a VLT with inter-switch links to the pairable switches 121 and 128.

Referring back to FIG. 4. At the process 420, STP heuristic rules are applied. The topology of the network determined during process 350 may be analyzed to determine its suitability for a base topology based on a spanning tree. In some examples, a spanning tree may be applied to most topologies. In some examples, one or more spanning trees for the network may be determined. In some examples, heuristic rules may be used to assign scores to each of the spanning trees. In some examples, a heuristic rule may assign a higher score to a spanning tree with a shorter longest path between switches than one with a longer longest path between switches. In some examples, the heuristic rules may be used to select a spanning tree with a highest score. In some examples, the inter-switch links of the selected spanning tree are identified and the other inter-switch links in the network may be designated to be blocked to avoid creating loops in the base topology.

At the process 430, MSTP heuristic rules are applied. The topology of the network determined during process 350 may be analyzed to determine its suitability for a base topology based on multiple spanning trees. In some examples, multiple spanning trees may be applied to most topologies. In some examples, networks with higher densities of inter-switch links may be more suitable for multiple spanning trees.

Figure 6:
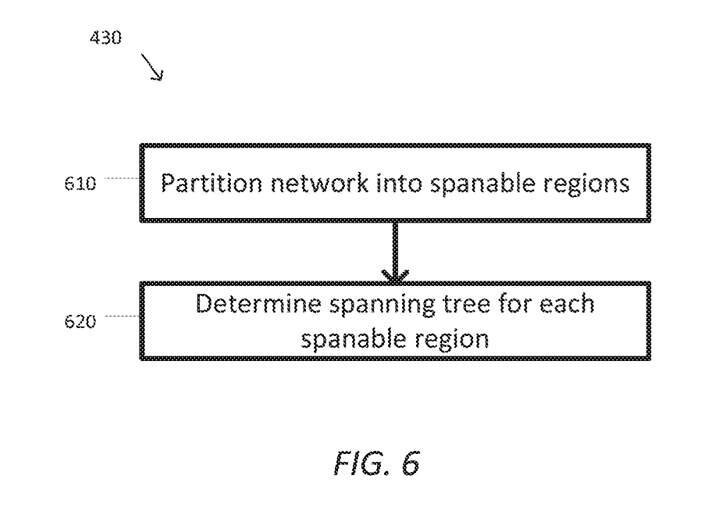
FIG. 6 is a simplified diagram of a process for applying MSTP heuristic rules to a network topology according to some embodiments.

FIG. 6 is a simplified diagram of the process 430 for applying MSTP heuristic rules to a network topology according to some embodiments. As shown in FIG. 6, the process 430 includes a process 610 for partitioning the network into spanable regions and a process 620 for determining a spanning tree for each spanable region. According to certain embodiments, the process 430 for applying MSTP heuristic rules to a network topology can be performed using variations among the processes 610 and 620 as would be recognized by one of ordinary skill in the art. In some embodiments, one or more of the processes 610 and 620 of process 430 may be implemented, at least in part, in the form of executable code stored on non-transient, tangible, machine readable media that when run by one or more processors (e.g., one or more processors in control unit 212 of network controller 110) may cause the one or more processors to perform one or more of the processes 610 and 620.

At the process 610, the network is partitioned into spanable regions. The topology of the network may be analyzed to determine multiple spanable regions within the topology. In some examples, heuristic rules may be used to identify spanable regions so that forwarding paths using the inter-switch links in each of the spanable regions are preferred over inter-switch links between the spanable regions. In some examples, the heuristic rules may consider a number of inter-switch links between two switches when evaluating the preferability of the inter-switch links. In some examples, the heuristic rules may consider a type of each switch and a bandwidth of ports coupled by the inter-switch links between two switches when evaluating the preferability of the inter-switch links. In some examples, the heuristic rules may identify a root for the network as a whole. In some examples, the heuristic rules may identify a regional root for each spanable region.

At the process 620, a spanning tree is determined for each spanable region. Each of the spanable regions determined during the process 610 may be analyzed to identify a spanning tree for that spanable region. In some examples, one or more spanning trees for each spanable region may be determined. In some examples, heuristic rules may be used to assign scores to each of the spanning trees. In some examples, a heuristic rule may assign a higher score to a spanning tree with a shorter longest path between switches than one with a longer longest path between switches. In some examples, the heuristic rules may be used to select a spanning tree with a highest score. In some examples, the inter-switch links of the selected spanning tree are identified and the other inter-switch links in the respective spanable region may be designated to be blocked to avoid creating loops in the base topology for that spanable region.

Referring back to FIG. 4. At the process 440, stacking heuristic rules are applied. The network controller analyzes the topology of the network determined during process 350 to determine its suitability for a base topology that includes one or more stacked switches. In some examples, heuristic rules may be used to detect daisy-chain patterns in the topology of the network. In some examples, the daisy-chain patterns may form loops. In some examples, heuristic rules may be used to assign scores to each of the daisy chains in the network. In some examples, a heuristic rule may assign a higher score to a daisy chain with more network links and/or inter-switch links coupling the switches in the daisy chain to other switches and/or network devices not in the daisy chain of switches so that the daisy chain of switches couples a larger number of other switches and/or network devices. In some examples, a heuristic rule may assign a higher score to a daisy chain where the other switches and/or network devices are coupled more uniformly to all of the switches in the daisy chain. In some examples, the heuristic rules may only include a switch in a daisy chain when the switch supports stacking. In some examples, the heuristic rules may assign a higher score to a daisy chain that forms a loop. In some examples, the heuristic rules may limit a number of switches in the daisy chain. In some examples, the number of switches may be limited to eight. In some examples, heuristic rules similar to the VLT heuristic rules of process 410 may be used to detect LAGs where a switch is coupled to two or more switches in the daisy chain and/or loop of switches.

At the process 450, heuristic rules for other base topologies may be applied. The topology of the network determined during process 350 may be further analyzed to determine the suitability of other base topologies to the network and/or sub-networks of the network. In some examples, SPBM heuristic rules may be applied to networks of any topology when the switches in the network support the MAC-in-MAC encapsulation of IEEE Standard 802.1aq. In some examples, TRILL heuristic rules may be applied to networks of any topology when the switches in the network support requirements for routing bridges. In some examples, LAG heuristic rules may be applied to identify LAGs from among inter-switch links that are coupled in parallel between two switches.

At the process 460, a base topology is selected. In some examples, multiple potential base topologies may be identified for the topology of the network determined during process 350. In some examples, the heuristic rules applied during the processes 410-450 may each assign one or more weights to each potential base topology in order to select among them. In some examples, the network may be divided into sub-networks, and the heuristic rules may be applied separately to each of the sub-networks. Based on results of the heuristic rules, the base topology for the network is selected. In some examples, combinations of one or more base topologies may be selected. In some examples, the combinations may be based on the sub-networks. In some examples, peer groups and VLTs may be selected where appropriate within a spanning tree.

Referring back to FIG. 3. At the process 370, flow control messages are transmitted. Based on the selected base topology, the network controller forms and transmits flow control messages to the switches. In some examples, the flow control messages provision the switches to implement the base topology. In some examples, the flow control messages may place one or more of the switches in desired modes. In some examples, the flow control messages may direct one or more of the switches to use desired forwarding protocols. In some examples, the flow control messages may install one or more desired forwarding rules in one or more of the switches. In some examples, the flow control messages may implement blocking on one or more of the ports of one or more of the switches to disable one or more of the inter-switch links. In some examples, when the selected base topology is a spanning tree, the flow control messages may selectively use port blocking to activate forwarding only along edges of the spanning tree. In some examples, when the selected base topology includes one or more peer groups, the flow control messages may provision corresponding switches into the peer groups and then designate the ICLs and/or VLTs.

At the optional process 380, the network is monitored. Once the network controller has configured the network, the network controller may begin monitoring the network for changes in the topology. In some examples, the network controller may receive one or messages indicating inter-switch links have gone up and/or down. In some examples, the network controller may stop receiving messages one of the switches. In some examples, the network controller may receive an initiation message and/or configuration and status messages showing the presence of a previously unknown switch. In some examples, the network controller may detect that one of the switches is rebooting. Based on its monitoring of the network, the network controller may determine that the topology of the network has changed. When the network controller determines that the changes are significant enough, the network controller may return to process 330 to discover a new topology for the network and repeat the processes of selecting and provisioning a new base topology.

According to some embodiments, method 300 of managing a network may provide many advantages. In some examples, method 300 may greatly reduce a time taken to provision the network. By automating the discovery and provisioning process, the network controller may select and provision the base topology with little or no input from human users. In some examples, monitoring of the network by process 380 may permit the network controller to advantageously adapt the network to changes in the topology of the network, again with little or no input from human users. In some examples, method 300 may aid a human user in selecting a better base topology by being able to make recommendations for the base topology. In some examples, method 300 may reduce costs associated with operating the network because method 300 may support repurposing of the network without having to manually move and/or change cabling that implements the inter-switch links.

Figure 7:
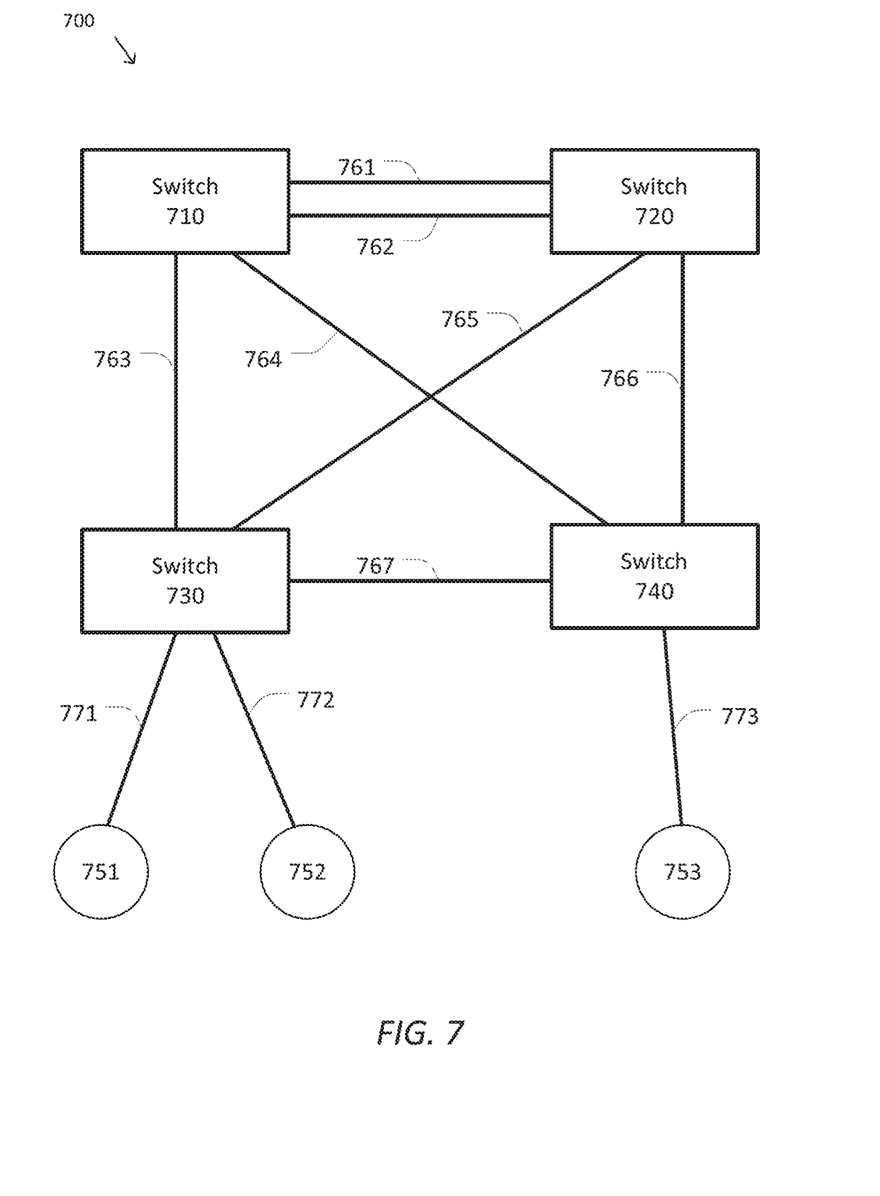
FIG. 7 is a simplified diagram of a network according to some embodiments.

FIG. 7 is a simplified diagram of a network 700 according to some embodiments. As shown in FIG. 7, network 700 includes switches 710, 720, 730, and 740. Network 700 further includes network devices 751-753. Network 700 also includes inter-switch links 761 and 762 coupling switches 710 and 720, an inter-switch link 763 coupling switches 710 and 730, an inter-switch link 764 coupling switches 710 and 740, an inter-switch link 765 coupling switches 720 and 730, an inter-switch link 766 coupling switches 720 and 730, and an inter-switch link coupling switches 730 and 740. Network 700 also includes a network link 771 coupling switch 730 to network device 751, a network link 772 coupling switch 730 to network device 752, and a network link 773 coupling switch 740 to network device 753.

Method 300 may be applied to network 700. During process 310 a network controller (not shown) may receive initiation messages from switches 710-740. During process 320, the network controller may further receive configuration and status messages from switches 710-740 providing the network controller with a type for each of the switches 710-740 as well as numbers and lists of active ports on each of the switches 710-740. During process 330, the network controller may transmit discovery request messages to each of the switches 710-740 asking each of the switches 710-740 to transmit discovery packets on the active ports. When the network controller receives the discovery response messages during process 340, the network controller may learn about inter-switch links 761-767 and network links 771-773. Based on this, the network controller may determine a topology for network 700 during process 350. During process 360, heuristic rules are applied to the topology of network 700 to select a base topology.

In some embodiments, the heuristic rules for VLTs may be applied to network 700 using process 410. Process 510 may be used to detect pairable switches in network 700 that are coupled by at least one inter-switch link. Network 700 includes pairable switches 710 and 720, switches 710 and 730, switches 710 and 740, switches 720 and 730, switches 720 and 740, and switches 730 and 740. During process 520, dual-come configurations between the pairable switches and other switches may be detected. Pairable switches 710 and 720 are part of two dual-home configurations with switches 730 and 740, respectively. Similarly, each of the other pairable switches in network 700 are part of two dual-home configurations. During process 530, heuristic rules for VLTs may be applied to select peer switches to form peer groups. Because each of the pairable switches in network 700 is part of two dual-home configurations, the heuristic rules based on numbers of dual-home configurations may not help recommend peer groups. However, because both switches 730 and 740 are coupled to network devices 751-753 using network links 771-773, pairable switches that include switches 730 and 740 are less desirable for peer groups. Consequently, pairable switches 710 and 720 may be selected as a peer group for network 700. During process 540, an ICL LAG between switches 710 and 720 (using inter-switch links 761 and 762) is detected, and VLTs and corresponding LAGs are detected for switch 730 (coupling switch 730 to the peer group of switches 710 and 720 using inter-switch links 763 and 765) and switch 740 (coupling switch 740 to the peer group of switches 710 and 720 using inter-switch links 764 and 766). In some examples, inter-switch link 767 may be removed from the base topology by blocking corresponding ports on switches 730 and 740. In some examples, process 370 may be used by the network controller to transmit flow control messages to switches 710-740 to provision the peer group, the ICL LAG, the VLT LAGs, and/or to block the ports corresponding to inter-switch link 767. In some examples, inter-switch link 767 may be reserved for failure recovery as part of the network monitoring in process 380.

In some embodiments, the heuristic rules for spanning trees (STP) may be applied to network 700 using process 420. In some examples, from among the many possible spanning trees, the heuristic rules may select a spanning tree coupling switch 710 to switch 720 using inter-switch links 761 and 762, coupling switch 720 to switch 730 using inter-switch link 765, and coupling switch 720 to switch 740 using inter-switch link 766. Inter-switch links 763, 764, and 767 may also be removed by blocking corresponding ports to remove loops from network 700.

Some embodiments of network controller 110 and/or switches 120-129 may include non-transient, tangible, machine readable media that include executable code that when run by one or more processors may cause the one or more processors to perform the processes of method 300 as described above. Some common forms of machine readable media that may include the processes of method 300 are, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Although illustrative embodiments have been shown and described, a wide range of modification, change and substitution is contemplated in the foregoing disclosure and in some instances, some features of the embodiments may be employed without a corresponding use of other features. One of ordinary skill in the art would recognize many variations, alternatives, and modifications. Thus, the scope of the invention should be limited only by the following claims, and it is appropriate that the claims be construed broadly and in a manner consistent with the scope of the embodiments disclosed herein.

What is claimed is:

1. A network controller comprising:
 a control unit; and
 one or more ports coupled to the control unit and configured to couple the network controller to a plurality of network switching devices of a network;
 the network controller being configured to:
  receive, on the one or more ports, configuration messages and status messages from the network switching devices;
  determine which network switching devices of the network switching devices are active based on the received configuration messages and status messages;
  determine which ports of the active network switching devices are active;
  transmit discovery request messages to the active network switching devices, each of the discovery request messages including instructions that every respective network switching device of the active network switching devices transmit a discovery request packet on every one of its active ports, the discovery request packet being different from each of the discovery request messages;
  receive discovery responses to the discovery request packets from the active network switching devices;
  determine a topology for the network based on the configuration and status messages and the discovery responses;
  apply heuristic rules, including one or more of virtual link trunking (VLT) heuristic rules, spanning tree heuristic rules, multiple spanning tree heuristic rules, or stacking heuristic rules, to select a base topology based on the topology; and
  transmit flow control messages to the active network switching devices to provision the network consistent with the base topology.

2. The network controller of claim 1, wherein to apply the VLT heuristic rules the network controller is further configured to:

detect pairable network switching devices in the network;
detect dual home configurations associated with the pairable network switching devices;
select peer network switching devices from the pairable network switching devices using the VLT heuristic rules to form peer groups; and
detect link aggregation groups (LAGs) and VLTs associated with the peer groups.

3. The network controller of claim 1, wherein to apply the spanning tree heuristic rules the network controller is further configured to:
determine one or more spanning trees in the network;
select a first spanning tree from the one or more spanning trees using the spanning tree heuristic rules; and
block inter-switch links in the network that are not part of the selected first spanning tree.

4. The network controller of claim 1, wherein to apply the multiple spanning tree heuristic rules the network controller is further configured to:
partition the network into spannable regions;
determine one or more spanning trees for each spannable region;
select a respective spanning tree for each spannable region from the one or more spanning trees for each spannable region using the multiple spanning tree heuristic rules; and
block inter-switch links in the network that are not part of the respective spanning trees.

5. The network controller of claim 1, wherein to apply the stacking heuristic rules the network controller is further configured to:
detect one or more daisy chains in the network that includes network switching devices that support stacking; and
select a first daisy chain from the one or more daisy chains using the stacking heuristic rules.

6. The network controller of claim 1, wherein:
each of the discovery responses includes:
an originating switch identifier identifying a first one of the active network switching devices that transmitted a corresponding discovery packet;
an egress port identifier identifying a first one of the active ports of the first active network switching device on which the corresponding discovery packet was transmitted;
a receiving switch identifier identifying a second one of the active network switching devices that received the corresponding discovery packet and returned the discovery response to the network controller; and
an ingress port identifier identifying a second one of the active ports of the second active network switching device on which the corresponding discovery packet was received.

7. A method of network management, the method comprising:
receiving, on one or more ports of a network controller, configuration messages and status messages from a plurality of switches of a network;
determining which switches of the plurality of switches are active based on the received configuration messages and status messages;
determining which ports of the active switches are active;
transmitting discovery request messages to the active switches, each of the discovery request messages including instructions that every respective active switch of the active switches transmit a discovery request packet on every one of its active ports;
receiving discovery responses to the discovery request packets from the active switches;
determining a topology for the network based on the configuration and status messages and the discovery responses;
applying heuristic rules, including one or more of virtual link trunking (VLT) heuristic rules, spanning tree heuristic rules, multiple spanning tree heuristic rules, or stacking heuristic rules, to select a base topology based on the topology; and
transmitting flow control messages to the active switches to provision the network consistent with the base topology.

8. The method of claim 7, wherein applying the VLT heuristic rules comprises:
detecting pairable switches in the network;
detecting dual home configurations associated with the pairable switches;
selecting peer switches from the pairable switches using the VLT heuristic rules to form peer groups; and
detecting link aggregation groups (LAGs) and VLTs associated with the peer groups.

9. The method of claim 7, wherein applying the spanning tree heuristic rules comprises:
determining one or more spanning trees in the network;
selecting a first spanning tree from the one or more spanning trees using the spanning tree heuristic rules; and
blocking inter-switch links in the network that are not part of the selected first spanning tree.

10. The method of claim 7, wherein applying the multiple spanning tree heuristic rules comprises:
partitioning the network into spannable regions;
determining one or more spanning trees for each spannable region;
selecting a respective spanning tree for each spannable region from the one or more spanning trees for each spannable region using the multiple spanning tree heuristic rules; and
blocking inter-switch links in the network that are not part of the respective spanning trees.

11. The method of claim 7, wherein applying the stacking heuristic rules comprises:
detecting one or more daisy chains in the network that includes switches that support stacking; and
selecting a first daisy chain from the one or more daisy chains using the stacking heuristic rules.

12. The method of claim 7, wherein:
each of the discovery responses includes:
an originating switch identifier identifying a first one of the active switches that transmitted a corresponding discovery packet;
an egress port identifier identifying a first one of the active ports of the first active switch on which the corresponding discovery packet was transmitted;
a receiving switch identifier identifying a second one of the active switches that received the corresponding discovery packet and returned the discovery response to the network controller; and
an ingress port identifier identifying a second one of the active ports of the second active switch on which the corresponding discovery packet was received.

13. An information handling system comprising:
a network controller comprising:
a control unit;

one or more ports coupled to the control unit and configured to couple the network controller to switching devices of a network; and a plurality of heuristic rules, the heuristic rules including one or more of virtual link trunking (VLT) heuristic rules, spanning tree heuristic rules, multiple spanning tree heuristic rules, or stacking heuristic rules;

wherein the control unit is configured to cause the network controller to perform operations comprising:

transmitting discovery request messages to the switching devices, each of the discovery request messages including instructions that every respective switching device of the switching devices transmit a discovery request packet on every one of its active ports;

receiving configuration messages, status messages, and discovery responses to the discovery request packets from the switching devices;

determining a network topology of the network based on the configuration messages, the status messages, and the discovery responses;

applying the heuristic rules;

selecting a base topology based on the applied heuristic rules; and transmitting flow control messages to the switching devices to provision the network consistent with the selected base topology.

14. The information handling system of claim 13, wherein applying the VLT heuristic rules comprises:

detecting pairable switching devices in the network;

detecting dual home configurations associated with the pairable switching devices;

selecting peer switching devices from the pairable switching devices using the VLT heuristic rules to form peer groups; and detecting link aggregation groups (LAGs) and VLTs associated with the peer groups.

15. The information handling system of claim 13, wherein applying the spanning tree heuristic rules comprises:

determining one or more spanning trees in the network;

selecting a first spanning tree from the one or more spanning trees using the spanning tree heuristic rules; and blocking inter-switch links in the network that are not part of the selected first spanning tree.

16. The information handling system of claim 13, wherein applying the multiple spanning tree heuristic rules comprises:

partitioning the network into spannable regions;

determining one or more spanning trees for each spannable region;

selecting a respective spanning tree for each spannable region from the one or more spanning trees for each spannable region using the multiple spanning tree heuristic rules; and blocking inter-switch links in the network that are not part of the respective spanning trees.

17. The information handling system of claim 13, wherein applying the stacking heuristic rules comprises:

detecting one or more daisy chains in the network that includes switching devices that support stacking; and selecting a first daisy chain from the one or more daisy chains using the stacking heuristic rules.

18. The information handling system of claim 13, wherein:

each of the discovery responses includes:

an originating switch identifier identifying a first one of the switching devices that transmitted a corresponding discovery packet;

an egress port identifier identifying a first port of the first switching device on which the corresponding discovery packet was transmitted;

a receiving switch identifier identifying a second one of the switching devices that received the corresponding discovery packet and returned the discovery response to the network controller; and an ingress port identifier identifying a second port of the second switching device on which the corresponding discovery packet was received.

* * * * *